US009563520B2

(12) United States Patent
Simon et al.

(10) Patent No.: US 9,563,520 B2
(45) Date of Patent: Feb. 7, 2017

(54) FILE LEVEL RECOVERY USING VIRTUAL MACHINE IMAGE LEVEL BACKUP WITH SELECTIVE COMPRESSION

(71) Applicant: Quantum Corporation, San Jose, CA (US)

(72) Inventors: Gerald Simon, San Jose, CA (US); Greg Wade, San Jose, CA (US); Barry Herman, San Jose, CA (US)

(73) Assignee: Quantum Corporation, San Jose, CA (US)

( * ) Notice: Subject to any disclaimer, the term of this patent is extended or adjusted under 35 U.S.C. 154(b) by 266 days.

(21) Appl. No.: 14/328,751

(22) Filed: Jul. 11, 2014

(65) Prior Publication Data

US 2016/0011946 A1     Jan. 14, 2016

(51) Int. Cl.
*G06F 11/00*     (2006.01)
*G06F 11/14*     (2006.01)

(52) U.S. Cl.
CPC ....... *G06F 11/1469* (2013.01); *G06F 11/1451* (2013.01); *G06F 11/1464* (2013.01)

(58) Field of Classification Search
CPC .............. G06F 11/1469; G06F 11/1451; G06F 11/1464; G06F 11/1446; G06F 11/1448; G06F 11/1458; G06F 17/30073; G06F 17/30076; G06F 17/30153; G06F 17/30233; G06F 17/30235; G06F 17/30238; G06F 17/30244; G06F 3/0667; G06F 2009/45579; H03M 7/30; G06G 9/45533; G06G 9/45537; G06G 9/45558
See application file for complete search history.

(56) References Cited

U.S. PATENT DOCUMENTS 8,060,476 B1* 11/2011 Afonso ............... G06F 11/1451
                                          707/649
2011/0196842 A1* 8/2011 Timashev ........... G06F 11/1469
                                          707/679

* cited by examiner

*Primary Examiner* — Michael Maskulinkski
*Assistant Examiner* — Anthony J Amoroso (57) ABSTRACT

Example apparatus and methods process virtual machine image level backups that may include files that are compressed and files that are not compressed. Example apparatus and methods may produce virtual machine image level backups by selectively compressing some files associated with the image while leaving other files in their uncompressed state. Example apparatus and methods may selectively recover a file or even an entire disk image from an image level backup that may include both compressed files and files that are not compressed. The file recovery or image recovery may be performed at the file level by accessing files in the image and selectively decompressing files that are compressed in the image while passing through files that are not compressed in the image. Different files in a single image may be compressed or decompressed using different techniques.

12 Claims, 11 Drawing Sheets

FILE LEVEL RECOVERY USING VIRTUAL MACHINE IMAGE LEVEL BACKUP WITH SELECTIVE COMPRESSION

BACKGROUND

Figure 1:
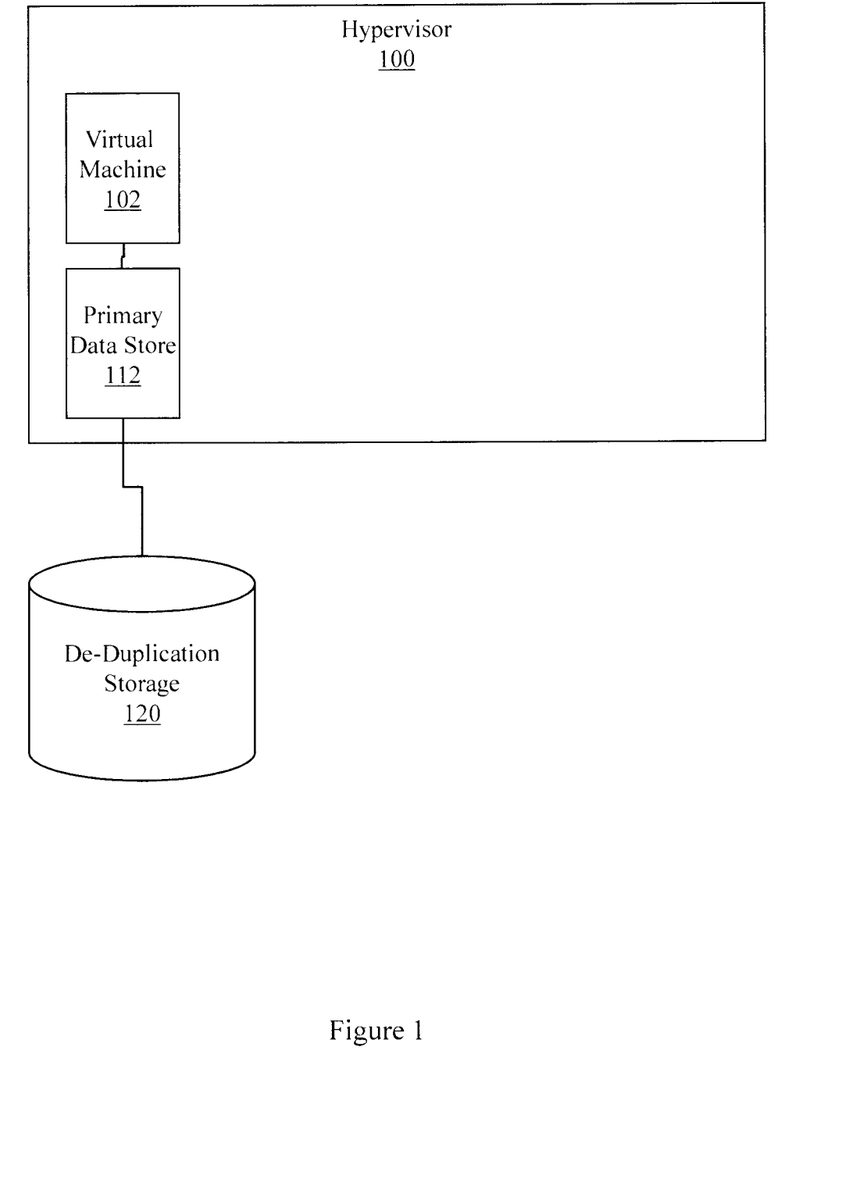
FIG. 1 illustrates an example configuration having a hypervisor, a virtual machine (VM), and a primary data store.

FIG. 1 illustrates a hypervisor 100 running a virtual machine 102. In computer science, a hypervisor is a piece of computer software, firmware, or hardware that creates and runs virtual machines. A hypervisor may also be called a virtual machine monitor (VMM). A computer on which a hypervisor is running a virtual machine may be referred to as a "host machine." The virtual machine running on the hypervisor may be referred to as a "guest machine." A hypervisor provides a virtual operating platform for a guest operating system. The hypervisor also manages execution of the guest operating system. Multiple instances of guest operating systems may share virtualized hardware resources. A virtual machine (VM) is a software implemented abstraction of a set of underlying computer hardware. VMs are based on the specifications of a hypothetical computer and may, therefore, emulate the computer architecture of a tangible computer, including the functions of the tangible computer.

FIG. 1 illustrates primary data store 112 as a virtualized hardware resource. The primary data store 112 may be associated with different actual hardware devices. In one example, de-duplication storage 120 may be the actual hardware resource that supports the virtualized hardware resource. Other actual hardware resources may support other virtualized hardware resources.

Some hypervisors may use virtual machine snapshots to improve the input/output (I/O) characteristics of a virtual machine (VM). A hypervisor may be configured to allow or cause a virtual machine to write a snapshot to a data store. A VM snapshot may be, for example, a file-based view of the state, disk data, memory, configuration, and other information associated with a VM at a specific point in time. A snapshot may be created for different reasons. It is possible to take multiple snapshots of a VM. A snapshot may be acquired even while a VM is running. A snapshot may be treated as a whole or may have its contents accessed individually. A snapshot may preserve the state and data of a VM at a specific point in time. The state may include, for example, the VM's power state (on, off, suspended). The data may include, for example, all the files touched by the VM and all the files that make up the VM. The data may also include, for example, information from disks, memory, and other devices touched by the VM.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example apparatus and methods process virtual machine image level backups that may include files that are compressed and files that are not compressed. Example apparatus and methods may produce virtual machine image level backups by selectively compressing some files while leaving other files in their uncompressed state. Example apparatus and methods may then selectively recover a file or even an entire disk image from the image level backup that may include both compressed files and files that are not compressed.

Backing up a virtual machine at the image level and then being able to recover files from the backup image at the file level provides significant improvements over conventional systems that only provide image level recovery. For example, being able to recover at the file level allows management of backups to be simplified while providing users access to specific files in a backup image when needed. Image level backups followed by file level recovery workflows avoid recovering an entire backup image, which recovery would add significant overhead to the recovery process for a single file.

Example apparatus and methods selectively compress files during image level backup. Conventional systems do not perform this selective compression. Instead, conventional systems may compress all files to be placed into a disk image. Unfortunately, compressing an entire disk image during backup may add significant overhead to the backup process. In addition, much of the additional overhead may be unnecessary in cases where individual files are not suitable candidates for compression, such as with video files, or files that have already been compressed.

Compressing an entire disk image during backup also introduces significant overhead when the fully compressed image is used for file level recovery. In order to perform any recovery, even of just a single file, a conventional system must first decompress the entire disk image. Only after this lengthy process is performed can conventional systems recover individual files from the disk image.

Figure 2:
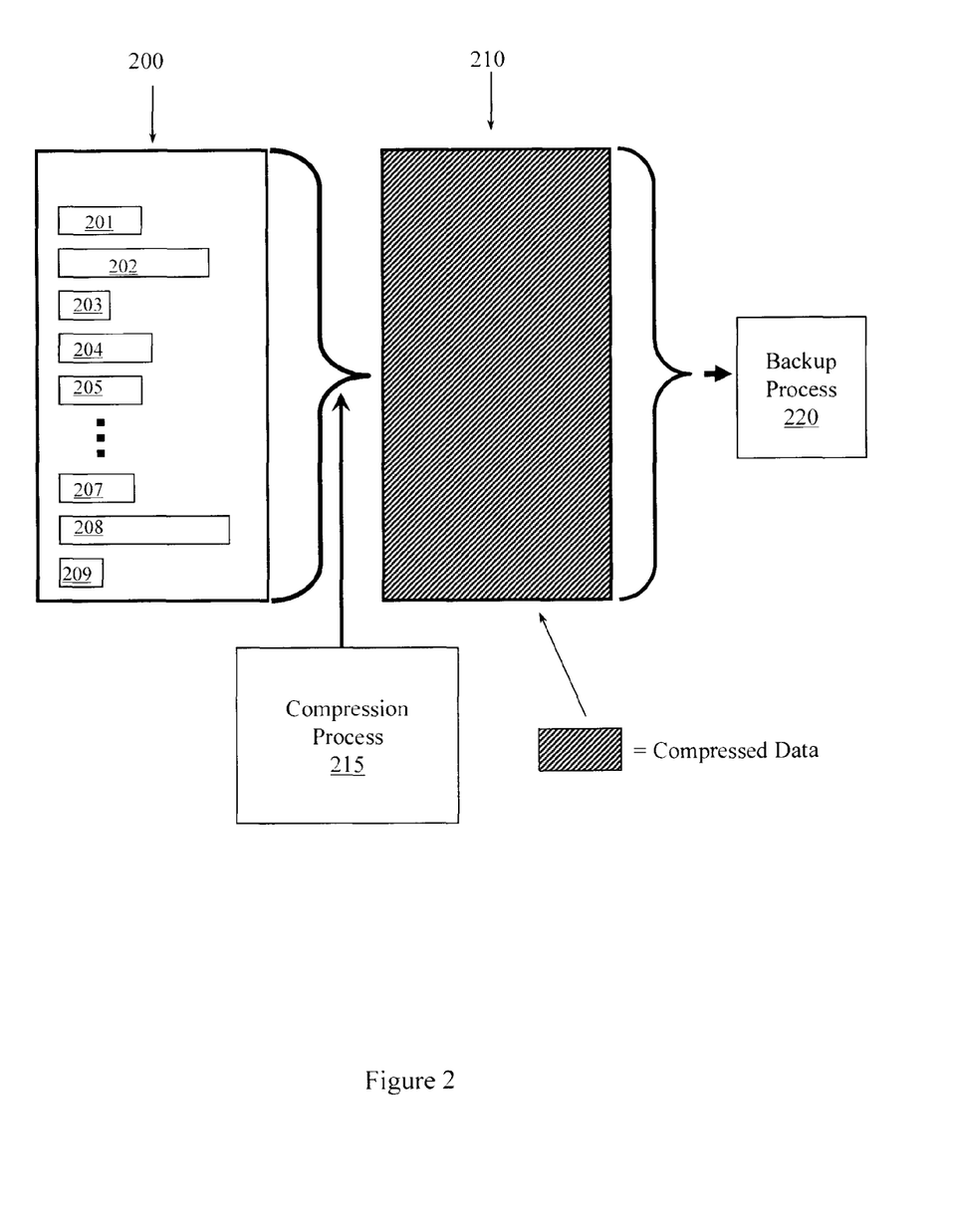
FIG. 2 illustrates producing a compressed image of a virtual machine's disk image.

FIG. 2 illustrates a virtual machine disk image 200. Disk image 200 includes files 201 and 202 through 209. The files 201 through 209 may have different sizes, types, ages, names, and other attributes. The files 201 through 209 may be associated with a file system. Disk image 200 is being backed up using a compression operation 215 that compresses the entire disk image 200 into a compressed image 210. The shaded region in FIG. 2 illustrates that the entire disk image is compressed. Compressing the entire disk image 200 to produce compressed image 210 may introduce significant unnecessary overhead into the backup process. Compressing the entire disk image 200 to produce compressed image 210 may also introduce significant unnecessary overhead into a file recovery process. The compressed image 210 may be provided to a backup process 220.

Figure 3:
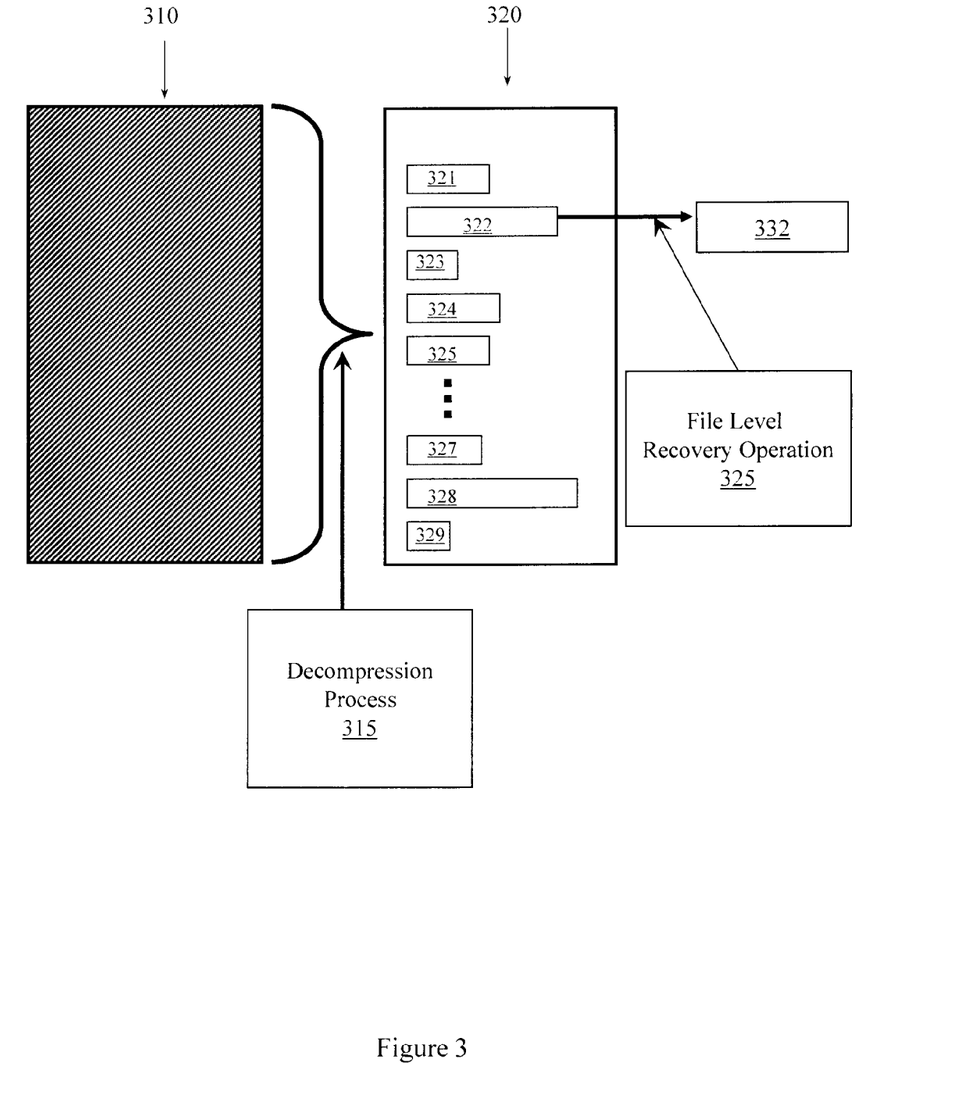
FIG. 3 illustrates file level recovery from a compressed image of a virtual machine's disk.

FIG. 3 illustrates file level recovery from a compressed disk image 310. Compressed disk image 310 may have been produced by compressing a virtual machine's entire disk image. There are files in compressed image 310, but the files may be inaccessible until the entire compressed image 310 is decompressed into uncompressed image 320 by a decompression operation 315. There is significant overhead involved in uncompressing the entire compressed disk image 310. The entire disk image 310 must be decompressed before an individual file can be recovered from the uncompressed image 320. Once the uncompressed image 320 is available, individual files (e.g., file 332) may be recovered. Once the uncompressed image 320 is available, individual files 321 and 322 through 329 may be individually available to a file level recovery operation 325. File level recovery operation 325 may identify a file 322 in the uncompressed image 320 and provide it as recovered file 332. Example apparatus and methods improve on conventional systems by performing selective compression when creating an image level backup. Example apparatus and methods also improve on conventional systems by allowing selective decompression or selective file selection during recovery.

Consider a virtual machine having a 100 GB disk. Assume that the 100 GB disk was backed up using a system that compressed the entire image. To recover an individual file from this backup, the entire 100 GB image needs to first be uncompressed before the file can be recovered. Example apparatus and methods improve on this approach by only selectively compressing files that are put into the backup and by allowing file level recovery with selective decompression from the backup.

In order to avoid the overhead of compressing the entire disk image during backup, only selective files are compressed by example apparatus and methods. Files are selected for compression based on pre-defined or user defined criteria, (e.g., file size, file type). For example, video files may be excluded from compression because they tend not to compress very well.

Figure 4:
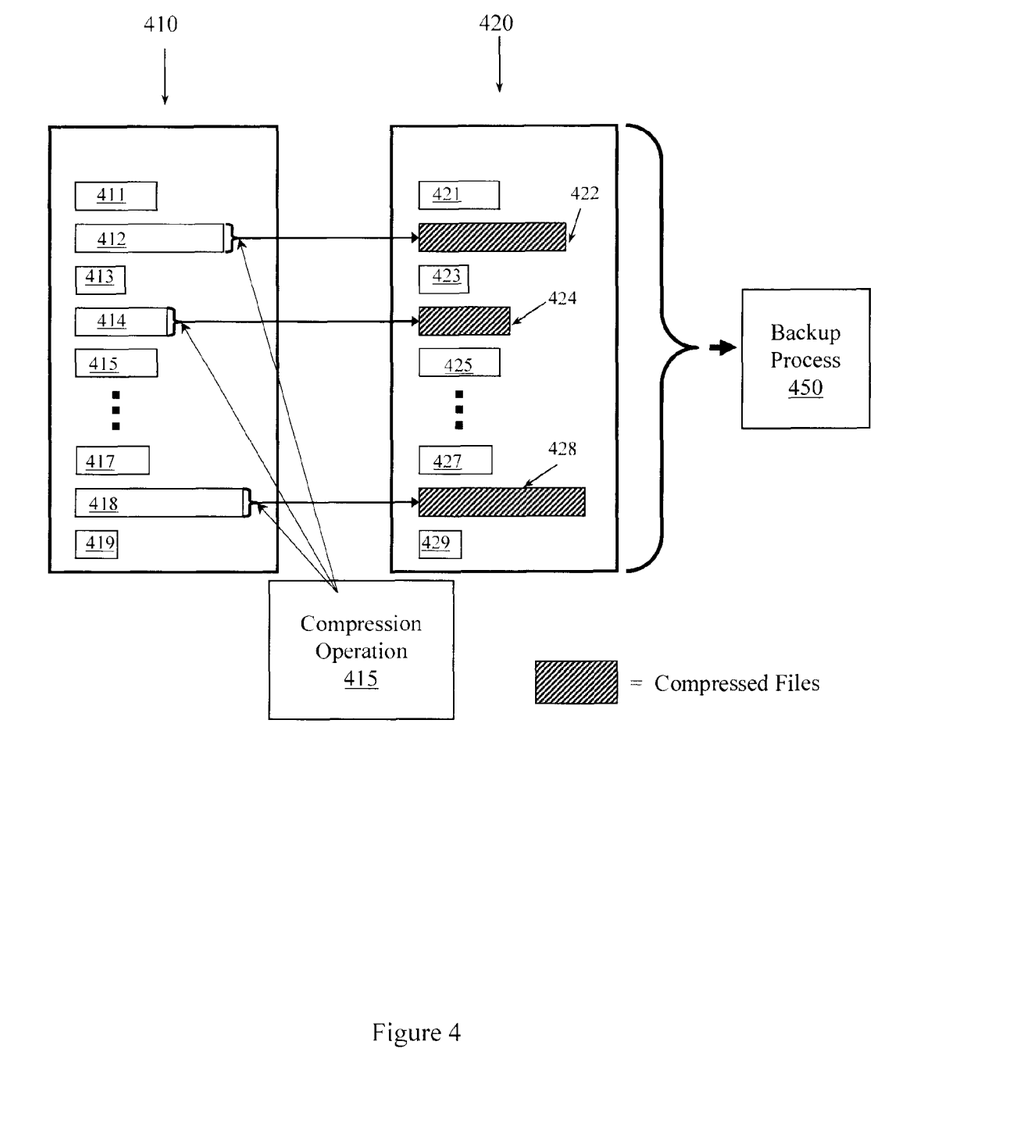
FIG. 4 illustrates producing a disk image where only selected files are compressed rather than the entire disk image.

FIG. 4 illustrates a disk image 410 where only selected files are going to be compressed into compressed image 420 rather than the entire disk image 410. Files 411 and 412 through 419 are available in disk image 410. Only selected members of files 411 through 419 are going to be compressed into compressed image 420. Only compressing certain files (e.g., files that compress well) reduces the compression overhead during backup creation by a backup process 450. Only compressing certain files (e.g., files selected by size, type, age, user) also reduces recovery overhead during recovery. Recovery overhead is reduced because file level recovery is possible without having to decompress an entire backup image. Selected members of files 411 through 419 (e.g., files 412, 414, 418) are compressed by a compression operation 415 and added to compressed image 420 in compressed format (e.g., 422, 424, 428). Other files (e.g., 411, 413, 415, 417, and 419) are not compressed and are added to compressed image 420 as uncompressed files 421, 423, 425, 427, and 429.

In one embodiment, creating an image level backup using selective compression may include take a snapshot of a virtual machine and then making a read/write copy of the snapshot. The read/write copy may then be mounted to a file system. While the read/write copy is mounted, files in the read/write copy may be selectively compressed while other files are left alone. Files may be selected for compression based on criteria including, for example, name, size, type, or user-designation. After the files have been selectively compressed in the mounted read/write copy, then file system buffers can be synchronized with the read/write copy. After the file system buffers are synchronized, then the read/write copy may be dismounted from the file system. An image level backup may then be created from the unmounted copy. Even though an image level backup is being created, file level recovery will be possible from the backup. The file level recovery may proceed without having to decompress the entire backup. If the file to be recovered is compressed, then it can be retrieved from the backup and just that file can be decompressed. If the file to be recovered isn't compressed, then the file can be retrieved and used without decompression.

Figure 5:
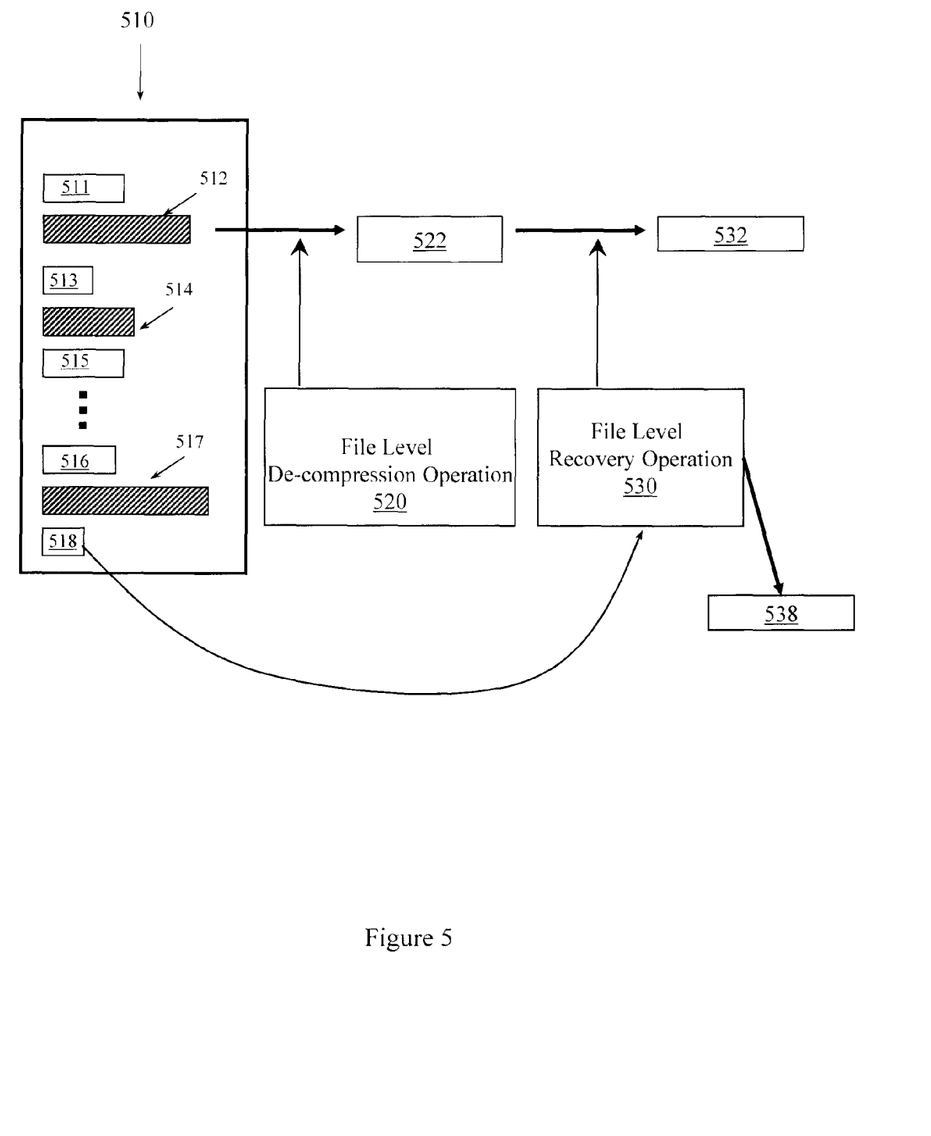
FIG. 5 illustrates doing file-level recovery from a compressed backup image that includes files that are compressed and files that are not compressed.

FIG. 5 illustrates performing a file-level recovery operation 530 from a compressed image backup 510 that includes files that are compressed and files that are not compressed. The entire compressed image backup 510 does not need to be decompressed to recover a single file. Compressed image 510 may include files 511, 513, 515 . . . 516, and 518 that are not compressed. Compressed image 510 may also include files 512, 514, and 517 that are compressed. If a user wants a file in compressed image 510 that is not compressed, the file may simply be recovered. If a user wants a file in compressed image 510 that is compressed, then a file level de-compression operation 520 may be performed. For example, a compressed file 512 may be processed by file level de-compression operation 520 to produce an un-compressed file 522. Un-compressed file 522 may then be processed by a file level recovery operation 530 to produce a recovered file 532. In another example, file 518 may be provided directly to the file level recovery operation 530 to produce recovered file 538.

In one embodiment, performing file recovery from a selectively compressed image level backup includes mounting the backup snapshot image that was created using selective compression, selecting a file to be recovered, and recovering the file at the file level, performing decompression if necessary. While a single file can be recovered, an entire image may also be recovered. In one embodiment, performing an image recovery from a selectively compressed image level backup includes making a copy of the backup snapshot image and then mounting the copy in read/write mode. A file system in the image may be walked to discover the files in the image. When a compressed file is encountered, the file may be decompressed in the read/write copy. After the file system has been walked, then file system buffers may be synchronized to the read/write copy and then the read/write copy may be unmounted. The full image may then be recovered from the unmounted copy.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 6:
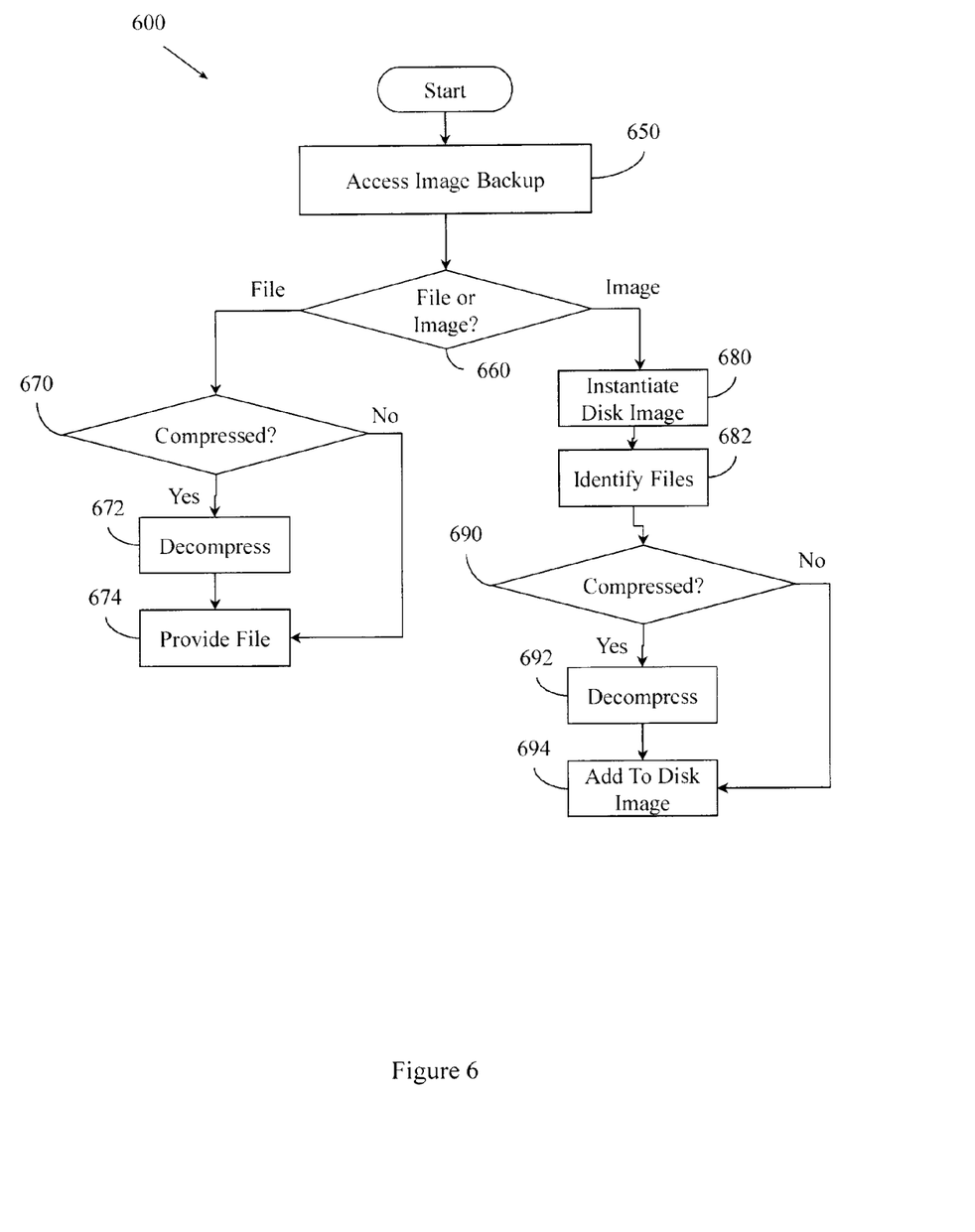
FIG. 6 illustrates an example method associated with virtual machine image level backup and recovery with selective compression and decompression.

FIG. 6 illustrates a method 600 associated with virtual machine image level backup and recovery with selective compression and decompression. Method 600 includes, at 650, accessing an image level backup. The image level backup may include files that are compressed and files that are not compressed. In one embodiment, different files may have been compressed using different approaches. The image level backup may have been created using actions like those described in connection with FIG. 7.

Method 600 also includes, at 660, determining whether a file is to be recovered or whether an entire image is to be recovered. The determination may be made based, for example, on information provided by a recovery operation, on information provided by a user, or on other information. Upon determining that a file is to be recovered from the image level backup of the virtual machine, method 600 proceeds to 670. Since files in the image level backup may either be compressed or not compressed, method 600 proceeds, at 670, to determine whether the file is compressed. The determination about whether the file is compressed may be based, for example, on information about the file that is carried by the file, on information about the file that is stored in an operating system or file system, on information provided by a user, on an examination of the file to see whether it is in a compressed state, or on other information. If the file is compressed in the image level backup, method 600 proceeds, at 672, by decompressing the file to be recovered into an uncompressed file. In one embodiment, where different files may have been compressed using different approaches, method 600 may include identifying an appropriate decompression approach and decompressing the file at 672 using the identified decompression approach.

Once the file has been decompressed, it may be provided as an uncompressed file at 674. If the file was not compressed in the image level backup, then method 600 proceeds to provide the file from the image level backup at 674 without performing decompression. Providing the file may include copying the contents of the file to another file, providing an inode that identifies the file, providing file system information that facilitates locating the file, or performing other computer based actions.

Upon determining at 660 that an entire disk image is to be recovered from the image level backup, method 600 proceeds to 680. Determining that an entire disk image is to be recovered may be based on information provided by a recovery operation, on information provided by a user, on information provided by a scheduled recovery process, or in other ways.

Method 600 continues, at 680, by instantiating a disk image file. Instantiating a disk image file may include sending a request to an operating system, sending a request to a file system, interacting with a hypervisor, or other computer based operation.

Method 600 may also include, at 682, identifying a set of files associated with the entire disk image. When an entire disk image is to be recovered, the set of files identified at 682 will be a set that is sufficient to recover the entire disk image. In one embodiment, identifying the set of files associated with the entire disk at 682 includes accessing file system metadata associated with files on the entire disk image. The file system metadata may facilitate walking a file system associated with the entire disk image. Walking the file system may in turn facilitate identifying a complete set of files that are needed to recover the entire disk image.

Method 600 also includes, at 690, determining whether members of the set of files are compressed and need to be decompressed or whether members of the set of files are not compressed and can simply be provided without being decompressed. When a file is identified as being compressed, method 600 may also include identifying a compression approach used to compress the file and a corresponding appropriate decompression approach.

If the determination at 690 for a member of the set of files is that the member of the set of files is compressed in the image level backup, method 600 proceeds, at 692, by decompressing the member of the set of files into an uncompressed file. In one embodiment, where different files may have been compressed using different approaches, method 600 may include identifying an appropriate decompression approach and decompressing the file at 692 using the identified decompression approach.

After the file is decompressed, the uncompressed file is added to the disk image file at 694. If the determination at 690 is that the member of the set of files is not compressed in the image level backup, method 600 proceeds, at 694, by adding the member of the set of files to the disk image file. Adding the member of the set of files to the disk image file may include copying a file, copying an inode, providing information to a file system that is managing the disk image, providing information to a disk manager, or other computer based operations. Actions 690, 692, and 694 may be performed for all members of the set of files identified at 682.

Figure 7:
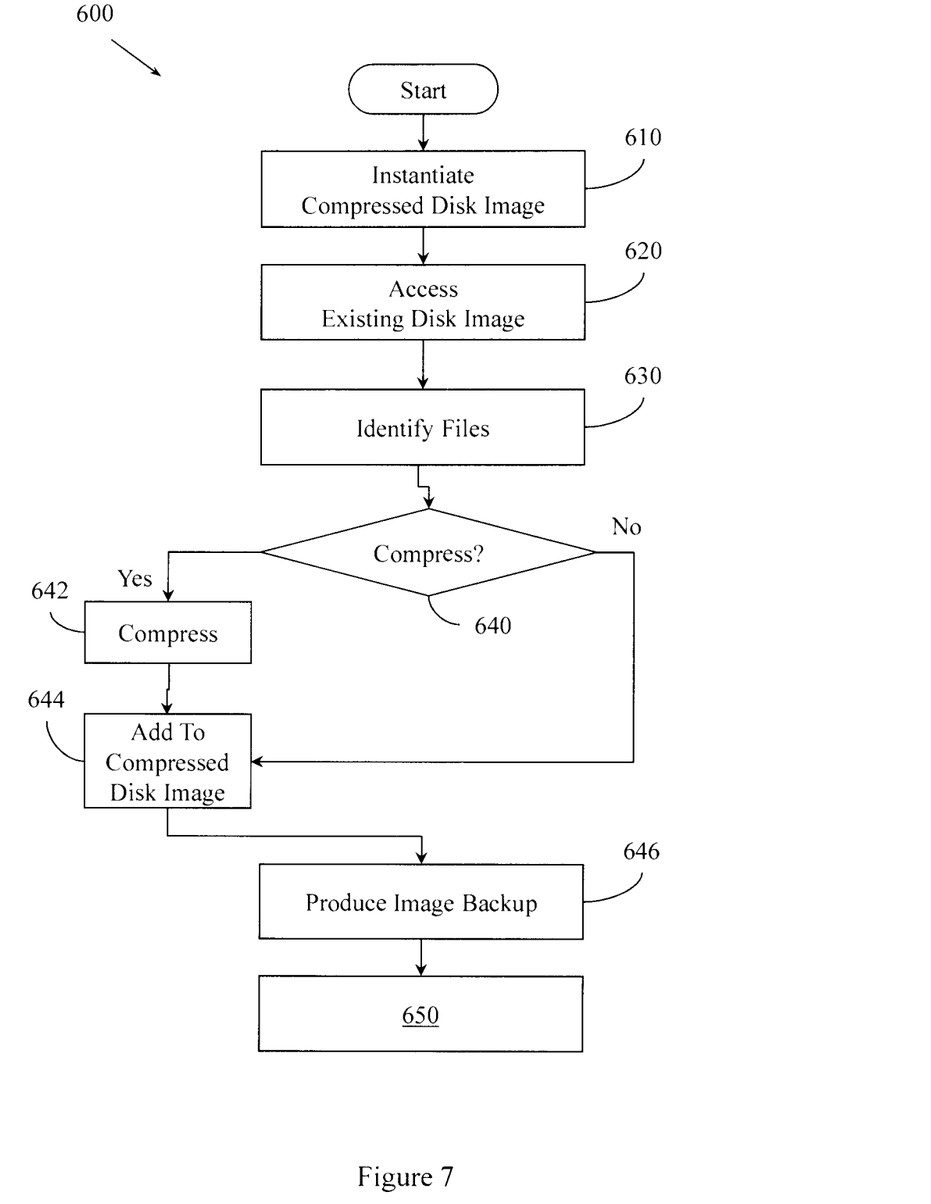
FIG. 7 illustrates an example method associated with virtual machine image level backup and recovery with selective compression and decompression.

FIG. 7 illustrates another embodiment of method 600. This embodiment of method 600 performs actions that create the image backup that is accessed at 650. This embodiment of method 600 includes, at 610, instantiating a compressed disk image. Instantiating a compressed disk image may include making a request to an operating system or file system, making a request for a file handle, making a request to an object broker, or other computer based operation that causes a file to be made available to method 600.

Method 600 also includes, at 620, accessing an existing disk image associated with the virtual machine. Accessing the existing disk image may include, for example, mounting the existing disk image to a file system associated with a hypervisor that supports the virtual machine.

Method 600 may include, at 630, identifying a plurality of files associated with the existing disk image. In one embodiment, the plurality of files may include all files that are associated with the virtual machine. In another embodiment, the plurality of files may include selected files that are associated with the virtual machine. In one embodiment, identifying files associated with the existing disk image at 630 includes accessing file system metadata associated with the existing disk image and walking a file system associated with the existing disk image based, at least in part, on the file system metadata. In another embodiment, a user may select the plurality of files. Walking the file system may involve, for example, a depth first search that visits all inodes in a file system tree.

Method 600 may decide, at 640, whether a member of the plurality of files associated with the existing disk image is to be compressed. In one embodiment, determining that the member of the set of files is to be compressed includes determining whether the member of the set of files has a size that satisfies a size criteria, determining whether the member of the set of files has a type that satisfies a type criteria, determining whether the member of the set of files has an age that satisfies an age criteria, determining whether the member of the set of files has a name that satisfies a name criteria, or determining other properties of the file. In one embodiment, determining whether the member of the set of files is to be compressed includes determining whether the member of the set of files has been designated by a user for compression.

Upon determining that the member of the plurality of files is to be compressed before being stored on the compressed disk image, method 600 proceeds, at 642, by compressing the member of the plurality of files into a compressed file. In one embodiment, where individual files may be compressed using different techniques, method 600 may include identifying an appropriate compression technique for the file. The technique may be identified based, at least in part, on file attributes, user inputs, or other criteria.

The compressed file is then added to the compressed disk image at 644. Upon determining that the member of the plurality of files is not to be compressed before being stored on the compressed disk image, method 600 proceeds, at 644, by adding the member of the plurality of files to the compressed disk image without compressing the file. The determination at 640 may be made for all files in the plurality of files.

Method 600 may also include, at 646, producing the image level backup from the compressed disk image. Producing the image level backup may include, for example, providing the compressed disk image to a backup process, making a copy of the compressed disk image, or other action. Since files may be selectively compressed, the image level backup may include files that are compressed and files that are not compressed. In one embodiment, the image level backup may be created at 646 after the compressed disk image includes a set of files from which the existing disk image can be recovered.

In one example, a method may be implemented as computer executable instructions. Thus, in one example, a computer-readable storage medium may store computer executable instructions that if executed by a machine (e.g., processor) cause the machine to perform method 600 or other methods described herein. While executable instructions associated with method 600 are described as being stored on a computer-readable medium, it is to be appreciated that executable instructions associated with other example methods described herein may also be stored on a computer-readable medium.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable storage medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, computers or other devices, or combinations of these.

Figure 8:
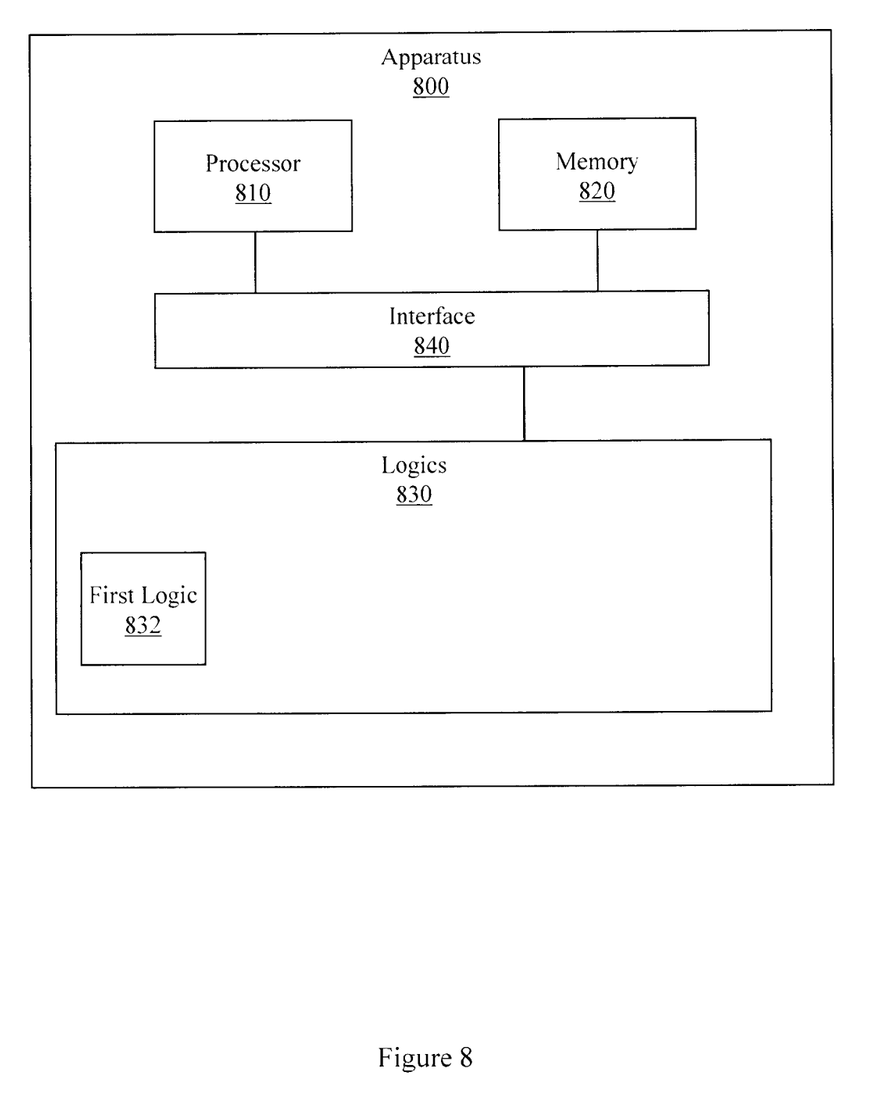
FIG. 8 illustrates an example apparatus associated with virtual machine image level backup and recovery with selective compression and decompression.

FIG. 8 illustrates an apparatus 800 that includes a processor 810, a memory 820, and a set 830 of logics that is connected to the processor 810 and memory 820 by an interface 840. The processor 810 may be, for example, a variety of various hardware processors including dual microprocessor and other multi-processor architectures. The processor 810 may run a hypervisor that provides a virtual machine. The virtual machine may have a virtual disk for which selective compression and decompression may be performed during backup and recovery operations to improve on conventional systems.

Memory 820 may include volatile memory and/or non-volatile memory. Non-volatile memory may include, for example, read only memory (ROM), programmable ROM (PROM), and other memory. Volatile memory may include, for example, random access memory (RAM), and other memory. The memory 820 can store a process or data. Memory 820 may store electronic data associated with a virtual disk associated with the virtual machine.

Apparatus 800 may include a first logic 832 that creates an image level backup for the virtual machine. The image level backup may include a compressed file associated with the virtual machine and an uncompressed file associated with the virtual machine. The image level backup may depend, at least in part, on the electronic data associated with the virtual disk. In one embodiment, since files may be processed individually while creating the image level backup, different files may be compressed different ways. In conventional systems, where the entire image is compressed as an image, only a single compression approach may be employed. Being able to compress different files in different ways facilitates compressing files using an appropriate compression approach.

In one embodiment, the first logic 832 creates the image level backup by creating a snapshot of the virtual machine and then creating a read/write copy of the snapshot. The read/write copy is modified by selectively compressing files in the read/write copy. Some files may be compressed and some files may be left as-is, without being compressed. In one embodiment, different files may be compressed in different ways. The decision about whether or how to compress a file may be based on different factors. For example, a file may be selectively compressed based, at least in part, on a file type, a file size, a file age, or a user designation.

The first logic 832 may synchronize a file system associated with the virtual machine to the read/write copy. Synchronizing the file system and the read/write copy may include, for example, synchronizing file system buffers, operating system buffers, virtual machine data stores, hypervisor data stores, or other data stores. The first logic 832 may create the image level backup from the read/write copy.

Figure 9:
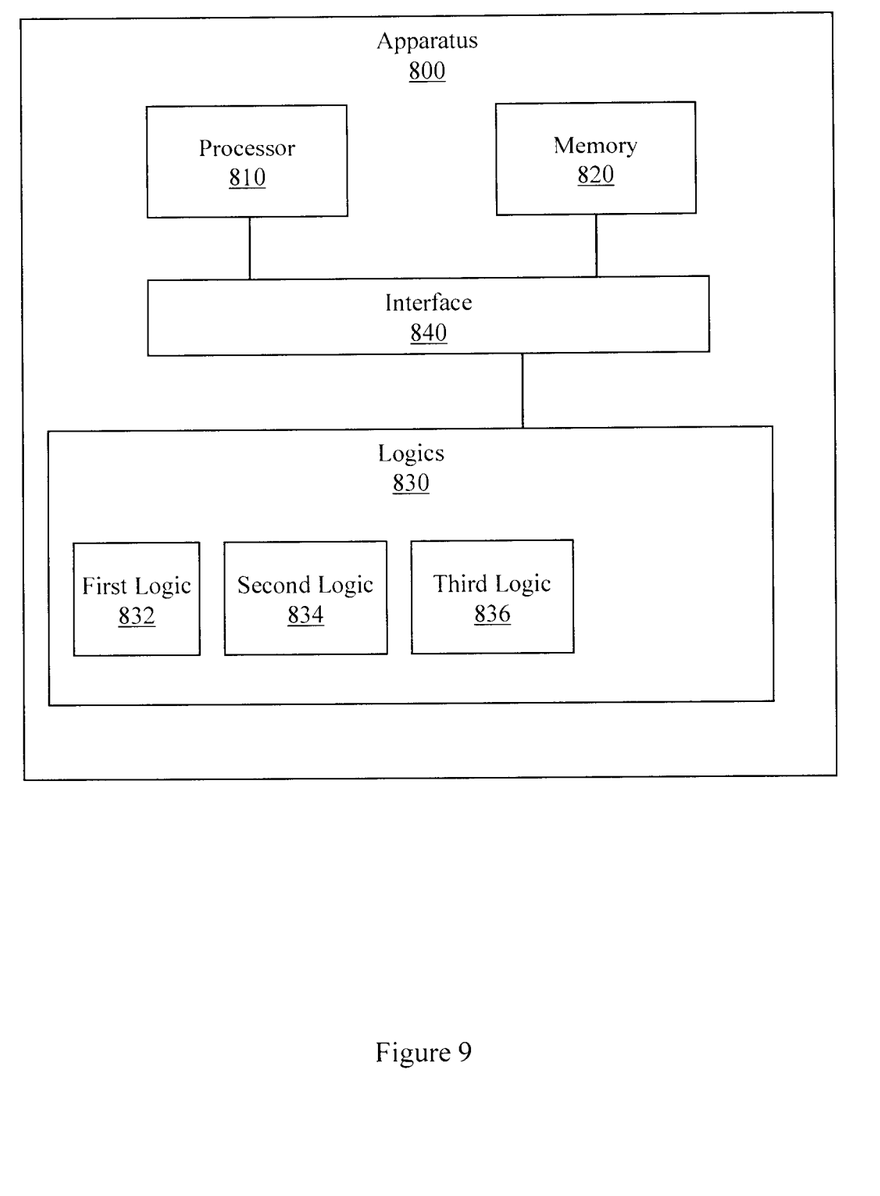
FIG. 9 illustrates an example apparatus associated with virtual machine image level backup and recovery with selective compression and decompression.

FIG. 9 illustrates another embodiment of apparatus 800 (FIG. 8). This embodiment includes a second logic 834 that recovers a selected file from the image level backup using file level recovery. In one embodiment, the second logic 834 recovers the selected file from the image level backup by establishing an association between the image level backup and a target file system associated with the hypervisor. Making the association may include, for example, mounting the image level backup to the target file system. Once the association has been made, the second logic 834 may take different actions for different files in the image level backup. Recall that the image level backup may have some files that are compressed and may have some files that are not compressed. Additionally, different files may have been compressed in different ways. Therefore, the second logic 834 may, upon determining that the selected file is not compressed in the mounted image level backup, provide the selected file to the target file system without decompressing the selected file. The second logic 834 may also, upon determining that the selected file is compressed in the mounted image level backup, decompresses the selected file to produce a decompressed file and provides the decompressed file to the target file system. In one embodiment, where different files may have been compressed in different ways, the second logic 834 may identify an appropriate decompression approach for a file and then decompress the file using the appropriate decompression approach.

This embodiment also includes a third logic 836 that recovers an entire image from the image level backup using file level recovery. The third logic 836 may recover the entire image from the image level backup by making a copy of the image level backup and establishing an association between the copy and a target file system associated with the hypervisor so that the associated copy can be read from and written to. Making the association may include, for example, mounting the copy to the target file system or otherwise making the copy visible to an operating system or file system.

To recover an entire image, the third logic 836 may identify a set of files in the mounted copy that are sufficient to recover the entire disk image. Identifying the set of files may include, for example, examining file system metadata, performing a file system operation (e.g., discover all), performing a database operation (e.g., find all), receiving user inputs, or performing another computer based operation.

The third logic 836 may, for members of the set of files, determine whether the files are compressed and need to be decompressed or whether the files are not compressed and can be processed without decompression. In one embodiment, where files may have been compressed individually using different compression approaches, the third logic 836 may identify an appropriate decompression approach on a per file basis.

The third logic 836 may, upon determining that the member is compressed, decompress the member file in the associated copy. For members that are not compressed, the third logic 836 may leave the file as-is in the associated copy. The third logic 836 may decompress files using different decompression approaches.

The third logic 836 may also synchronize the target file system and the associated copy. Synchronizing the target file system and the associated copy may include synchronizing buffers associated with an operating system or file system, or may include synchronizing data stores associated with an operating system, file system, virtual machine, or hypervisor. The third logic 836 may also break or otherwise end the association between the associated copy and the target file system to produce a free copy from which the entire disk image can be recovered.

Figure 10:
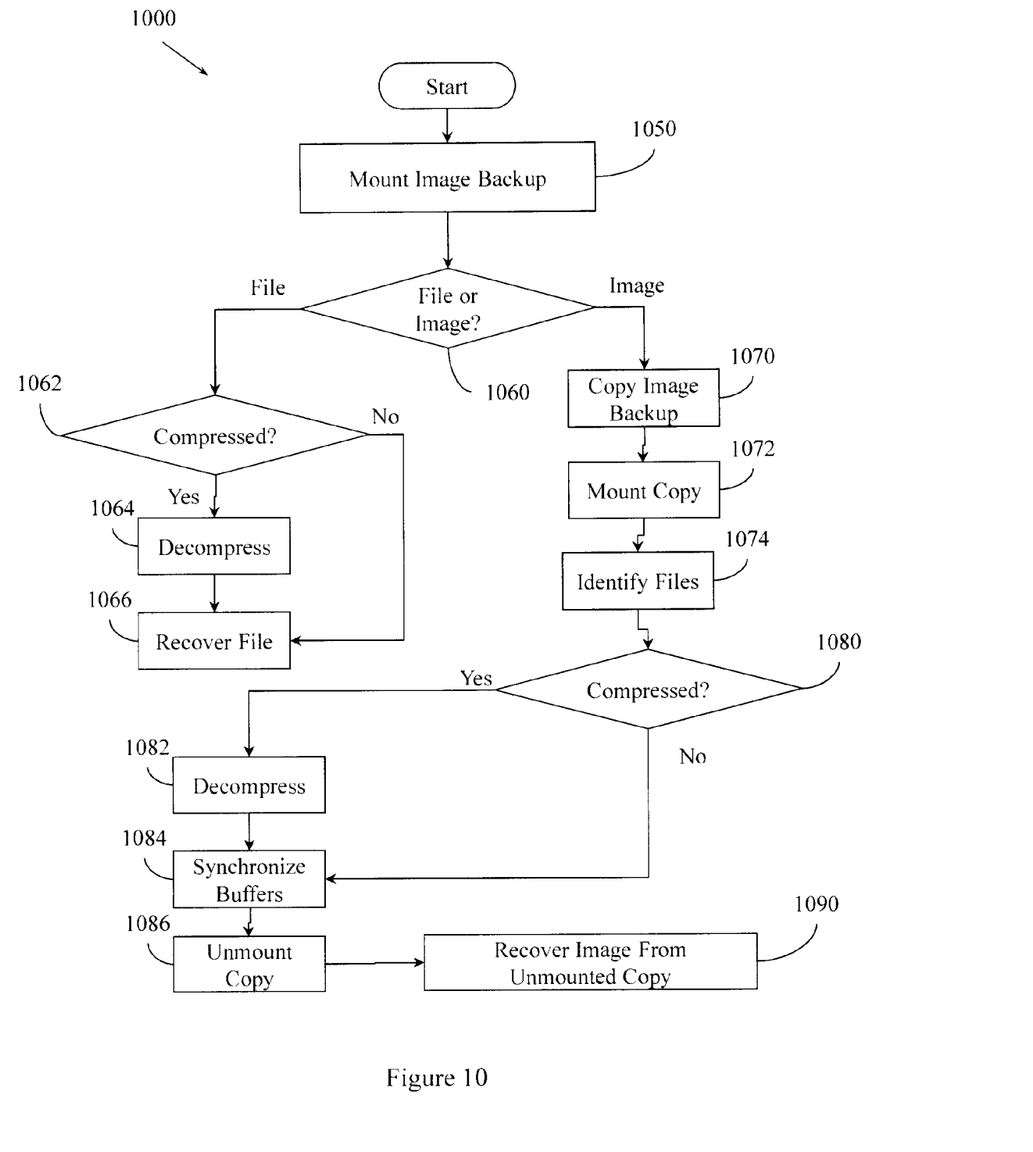
FIG. 10 illustrates an example method associated with virtual machine image level backup and recovery with selective compression and decompression.

FIG. 10 illustrates a method 1000 for processing an image level backup of a virtual machine. The image level backup may include files that are compressed and files that are not compressed. In one embodiment, individual files may be compressed in different ways. Method 1000 may perform file recovery or image recovery at the file level.

Method 1000 includes, at 1050, mounting the image level backup to a target file system to produce a mounted image level backup. "Mounting" is used in its computer science term of art meaning. In one embodiment, mounting is the attaching of an additional file system to a currently accessible file system. The additional file system may be associated with the image level backup. The currently accessible file system may be associated with the running virtual machine or hypervisor. Recall that a file system may be, for example, a hierarchy of directories that may be used to organize files on a computer or computer readable storage medium. Mounting a file system may include providing information to an operating system about where in the hierarchy of directories to attach the file system being mounted. The attachment point may be referred to as the mount point. The mount point may become the root directory of the file system being mounted. Original contents of a directory that is used as a mount point may become invisible and inaccessible while the additional file system is still mounted.

Method 1000 includes, at 1060, determining whether a file will be recovered or whether an image will be recovered. Upon determining that a file is to be recovered, the file may be identified. Identifying the file may include, for example, receiving a file name from a recovery process, receiving a pointer to a file, receiving an inode, or other action. Method 1000 may proceed, at 1062, to determine whether the file to be recovered is compressed. Upon determining that the file is not compressed in the mounted image level backup, method 1000 may provide the file to the target file system at 1066 without decompressing the file. Information upon which the determination of whether the file is compressed can be made may be found in the file system that is mounted, in the operating system, in the image, in metadata associated with the file, in the file itself, or elsewhere.

Upon determining at 1062 that the file is compressed in the mounted image level backup, method 1000 may, at 1064, decompress the file to produce a decompressed file. The decompressed file may then be provided to the target file system at 1066. In one embodiment, where individual files may be compressed in different ways, method 1000 may include identifying a decompression approach for decompressing the file at 1064. Information upon which the identification of the appropriate decompression approach can be made may be found in the file system that is mounted, in the operating system, in the image, in metadata associated with the file, in the file itself, or elsewhere.

Upon determining that an entire disk image is to be recovered from the image level backup, method 1000 may proceed, at 1070, to make a copy of the image level backup. Method 1000 may, at 1072, mount the copy in a read/write mode to a target file system to produce a mounted copy. The target file system may be associated with a virtual machine, a hypervisor, a host machine, or other computer or process.

Method 1000 includes, at 1074, identifying a set of files in the mounted copy that are sufficient to recover the entire disk image. The identification may be based, for example, on file system metadata, on information available in the disk image, on information available in the target file system, on user inputs, or on other data. In one embodiment, identifying the set of files in the mounted copy includes accessing file system metadata associated with files on the entire disk image and walking a file system associated with the entire disk image based, at least in part, on the file system metadata.

At 1080, method 1000 may make determinations for members of the set of files. Upon determining that a member is compressed, method 1000 may, at 1082, decompress the member in the mounted copy. If the member is not compressed, method 1000 may proceed to the next file until all the files have been considered.

Method 1000 may also include, at 1084, synchronizing a buffer associated with the target file system to the mounted copy. Recall that the mounted image may have had its file system and that the target file system has its own file system. While mounted in the target system, file system metadata, operating system metadata, state, status, or other information may have become unsynchronized. Synchronizing the buffer at 1084 facilitates continuing error-free operations in the two file systems or other processes.

Method 1000 includes, at 1086, unmounting the mounted copy from the target file system to produce an unmounted copy, and, at 1090, recovering the entire disk image from the unmounted copy.

Figure 11:
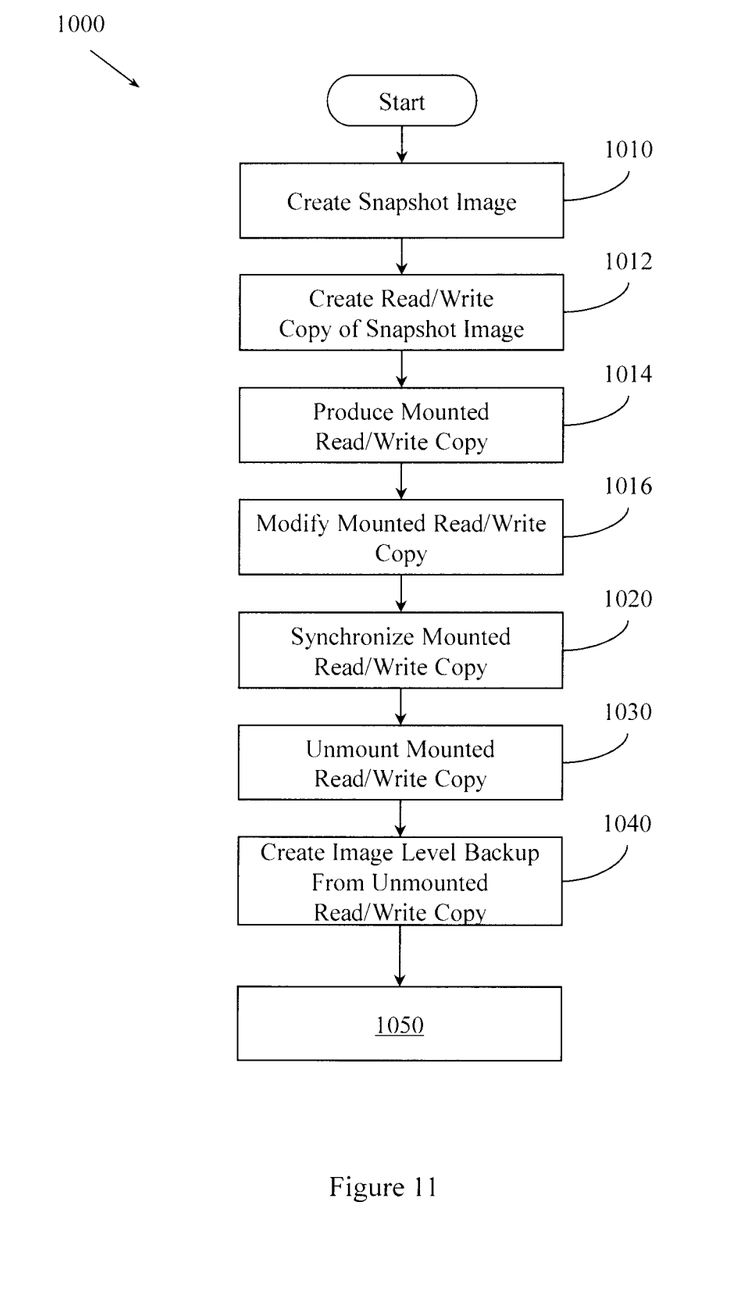
FIG. 11 illustrates an example method associated with virtual machine image level backup and recovery with selective compression and decompression.

FIG. 11 illustrates another embodiment of method 1000 (FIG. 10). This embodiment of method 1000 creates the image level backup that is used in FIG. 10. Creating the image level backup may include, at 1010, creating a snapshot image of the virtual machine. Recall that a snapshot is a file-based view of the state, disk data, memory, file system, configuration, or other information associated with a VM at a specific point in time. Creating the snapshot image may include, for example, making a request to a hypervisor.

Method 1000 also includes, at 1012, creating a read/write copy of the snapshot image. In one embodiment, the read/write copy is made because the snapshot may be used for other purposes while the image is being created. At 1014, the copy is read/write mounted to a file system associated with a hypervisor that supports the virtual machine. With the copy mounted read/write, files in the copy may now be manipulated or modified in the copy. For example, method 1000 may, at 1016, modify the mounted read/write copy by selectively compressing one or more files in the mounted read/write copy.

A file in the mounted read/write copy may be selectively compressed upon determining that the file has a size that satisfies a size criteria, has a type that satisfies a type criteria, has an age that satisfies an age criteria, or has a name that satisfies a name criteria. For example, files that are more than a year old may be compressed while files that are smaller than 4 k may not be compressed. A file in the mounted read/write copy may also be selectively compressed upon determining that the file has been designated by a user for compression. In one embodiment, different files may be compressed in different ways based, for example, on file type, size, age, owner, protections, security, or other attributes. For example, audio files may be compressed using one compression technique while text files may be compressed using a different compression technique. This is not performed in conventional systems because in conventional systems the entire image is compressed using a single compression technique.

Once the files have been modified, method 1000 may proceed, at 1020, to synchronize the mounted read/write copy and a data store or data structure (e.g., file system buffer) associated with the file system associated with the hypervisor. The read/write copy may then be unmounted at 1030 and the image level backup created from the unmounted read/write copy at 1040. Unmounting the read/write copy breaks down the relationship established by mounting the read/write copy.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A method, comprising:
   upon determining that an entire disk image is to be recovered from an image level backup of a virtual machine, where the image level backup may include files that are compressed and files that are not compressed:
      mounting the image level backup to a target file system to produce a mounted image level backup;
      making a copy of the image level backup;
      mounting the copy in a read/write mode to a target file system to produce a mounted copy;
      identifying a set of files in the mounted copy that are sufficient to recover the entire disk image;
      for a member of the set of files, upon determining that the member is compressed, decompressing the member of the set of files in the mounted copy;
      synchronizing a buffer associated with the target file system to the mounted copy;
      unmounting the mounted copy from the target file system to produce an unmounted copy; and
      recovering the entire disk image from the unmounted copy.

2. The method of claim 1, comprising:
   upon determining that file level recovery is to be performed from the image level backup:
      identifying a file to be recovered from the mounted image level backup;
      upon determining that the file is not compressed in the mounted image level backup, providing the file to the target file system without decompressing the file, and
      upon determining that the file is compressed in the mounted image level backup, decompressing the file to produce a decompressed file and providing the decompressed file to the target file system.

3. The method of claim 1, where identifying the set of files in the mounted copy includes accessing file system metadata associated with files on the entire disk image and walking a file system associated with the entire disk image based, at least in part, on the file system metadata.

4. The method of claim 1, comprising:
   creating a snapshot image of the virtual machine;
   creating a read/write copy of the snapshot image;
   producing a mounted read/write copy by mounting the read/write copy to a file system associated with a hypervisor that supports the virtual machine;
   modifying the mounted read/write copy by selectively compressing one or more files in the mounted read/write copy;
   synchronizing the mounted read/write copy and a buffer associated with the file system associated with the hypervisor;
   creating an unmounted read/write copy by unmounting the read/write copy from the file system associated with the hypervisor, and
   creating the image level backup from the unmounted read/write copy.

5. The method of claim 4, where a file in the mounted read/write copy is selectively compressed upon determining that the file has a size that satisfies a size criteria, has a type that satisfies a type criteria, has an age that satisfies an age criteria, or has a name that satisfies a name criteria, or upon determining that the file has been designated by a user for compression.

6. The method of claim 4, comprising:
   selecting a decompression approach for decompressing the file to produce a decompressed file and decompressing the file using the decompression approach, and
   selecting a compression technique for compressing a member of the one or more files in the mounted read/write copy and compressing the member using the compression technique.

7. An apparatus, comprising:
   a processor that runs a hypervisor that provides a virtual machine;
   a memory that stores electronic data associated with a virtual disk associated with the virtual machine;
   a set of logics; and an interface that connects the processor, the memory, and the set of logics;

the set of logics comprising:

a first logic that creates an image level backup for the virtual machine, where the image level backup includes a compressed file associated with the virtual machine and an uncompressed file associated with the virtual machine, where the image level backup depends, at least in part, on the electronic data associated with the virtual disk, and where the first logic creates the image level backup by:

creating a snapshot of the virtual machine;

creating a read/write copy of the snapshot;

modifying the read/write copy by selectively compressing a file in the read/write copy;

synchronizing a file system associated with the virtual machine to the read/write copy, and creating the image level backup from the read/write copy.

8. The apparatus of claim 7, where a file is selectively compressed based, at least in part, on a file type, a file size, a file age, or a user designation.

9. The apparatus of claim 7, comprising:

a second logic that recovers a selected file from the image level backup using file level recovery.

10. The apparatus of claim 9, where the second logic recovers the selected file from the image level backup by:

establishing an association between the image level backup and a target file system associated with the hypervisor;

upon determining that the selected file is not compressed in the mounted image level backup, providing the selected file to the target file system without decompressing the selected file, and upon determining that the selected file is compressed in the mounted image level backup, decompressing the selected file to produce a decompressed file and providing the decompressed file to the target file system.

11. The apparatus of claim 9, comprising:

a third logic that recovers an entire image from the image level backup using file level recovery.

12. The apparatus of claim 11, where the third logic recovers the entire image from the image level backup by:

making a copy of the image level backup;

establishing an association between the copy and a target file system associated with the hypervisor to produce an associated copy, where the associated copy can be read from and written to;

identifying a set of files in the mounted copy that are sufficient to recover the entire disk image;

for a member of the set of files, upon determining that the member is compressed, decompressing the member file in the associated copy;

synchronizing the target file system and the associated copy;

dis-establishing the association between the associated copy and the target file system to produce a free copy; and recovering the entire disk image from the free copy.

* * * * *